United States Patent
Blase et al.

(10) Patent No.: US 12,208,479 B2
(45) Date of Patent: Jan. 28, 2025

(54) TELESCOPIC COVER FOR A MACHINE TOOL

(71) Applicant: IGUS GMBH, Cologne (DE)

(72) Inventors: Frank Blase, Bergisch Gladbach (DE); Bilal Yilmaz, Cologne (DE); Andreas Hermey, Hennef (DE)

(73) Assignee: IGUS GMBH, Cologne (DE)

( * ) Notice: Subject to any disclaimer, the term of this patent is extended or adjusted under 35 U.S.C. 154(b) by 951 days.

(21) Appl. No.: 17/309,085

(22) PCT Filed: Oct. 16, 2019

(86) PCT No.: PCT/EP2019/078037
§ 371 (c)(1),
(2) Date: Oct. 21, 2021

(87) PCT Pub. No.: WO2020/083718
PCT Pub. Date: Apr. 30, 2020

(65) Prior Publication Data
US 2022/0048150 A1    Feb. 17, 2022

(30) Foreign Application Priority Data
Oct. 23, 2018   (DE) .................... 20 2018 106 055.4

(51) Int. Cl.
*B23Q 11/08*   (2006.01)
*F16P 1/02*   (2006.01)

(52) U.S. Cl.
CPC ............ *B23Q 11/0825* (2013.01); *F16P 1/02* (2013.01); *B23Q 2011/0808* (2013.01)

(58) Field of Classification Search
CPC ......... B23Q 11/0825; B23Q 2011/0808; F16P 1/02; E06B 3/4663
See application file for complete search history.

(56) References Cited

U.S. PATENT DOCUMENTS 1,140,100 A * 5/1915 Bash .................... B23Q 11/08
                                                       160/202
2,725,578 A * 12/1955 Hauser-Keller ..... A61G 7/1019
                                                        4/565.1
(Continued)

FOREIGN PATENT DOCUMENTS

CN       105899329 A     8/2016
DE         2020109       11/1971
(Continued)

OTHER PUBLICATIONS

International Search Report from corresponding PCT Appln. No. PCT/EP2019/078037, dated May 26, 2020.
(Continued)

*Primary Examiner* — Johnnie A. Shablack
(74) *Attorney, Agent, or Firm* — Grossman, Tucker, Perreault & Pfleger, PLLC (57) ABSTRACT

A telescopic cover comprising several telescopic members for a machine tool. The telescopic members can move back and forth with respect to each other and are arranged so that they can be guided with respect to the direction of movement in an overplapping manner, can extend in two directions of movement and in guide rails that are arranged in parallel and at a distance from each other. In order to provide a telescopic cover that is constructive and easy to produce and light to move, the telescopic members respectively comprise a section with which they bridge over guide rails arranged at a distance therefrom forming a continuous arc-shaped cross-section in a first cross-section perpendicular to the direction of movement.

13 Claims, 6 Drawing Sheets

(56) References Cited

U.S. PATENT DOCUMENTS

| | | | | |
|---|---|---|---|---|
| 3,565,153 A * | 2/1971 | Loos | B23Q 11/0825 | 160/202 |
| 3,570,578 A * | 3/1971 | Loos | B23Q 11/0825 | 160/202 |
| 3,578,061 A * | 5/1971 | Hascheck | B23Q 11/0825 | 160/202 |
| 3,603,373 A * | 9/1971 | Loos | B23Q 11/0825 | 160/202 |
| 3,603,651 A * | 9/1971 | Weber | B23Q 11/0875 | 409/134 |
| 3,751,120 A * | 8/1973 | Kietz | B23Q 11/0825 | 160/202 |
| 3,785,418 A * | 1/1974 | Hennig | B23Q 11/0825 | 160/202 |
| 3,824,890 A * | 7/1974 | Zettler | F16C 29/08 | 409/134 |
| 4,771,906 A * | 9/1988 | Hennig | B23Q 11/0825 | 220/8 |
| 5,119,869 A * | 6/1992 | Henning | B23Q 11/0825 | 160/202 |
| 5,156,195 A * | 10/1992 | Wehler | E04B 1/34305 | 160/202 |
| 5,169,223 A * | 12/1992 | Suzuki | F16H 21/04 | 160/202 |
| 5,482,414 A | 1/1996 | Hayashi et al. | | |
| 5,560,415 A | 10/1996 | Geissler | | |
| 5,807,043 A * | 9/1998 | Blank | B23Q 1/017 | 29/DIG. 56 |
| 5,863,163 A * | 1/1999 | Wehler | F16P 3/02 | 160/202 |
| 5,915,897 A * | 6/1999 | Reynolds | B23Q 11/0825 | 160/202 |
| 6,039,516 A * | 3/2000 | Diels | B23Q 11/0825 | 160/202 |
| 6,120,222 A * | 9/2000 | Hiramoto | B23Q 11/0042 | 409/137 |
| 6,419,002 B1 * | 7/2002 | Wang | B23Q 11/0825 | 160/202 |
| 6,422,290 B1 * | 7/2002 | Tabellini | F16F 1/428 | 160/202 |
| 6,431,249 B1 * | 8/2002 | Tabellini | B23Q 11/0825 | 160/202 |
| 6,446,397 B1 * | 9/2002 | O'Connor | B23Q 11/0825 | 160/202 |
| 6,488,072 B1 * | 12/2002 | Wang | B23Q 11/0825 | 160/222 |
| 7,341,092 B2 * | 3/2008 | O'Rourke | B23Q 11/0875 | 160/223 |
| 7,458,754 B2 * | 12/2008 | Hsieh | B23Q 11/0825 | 29/DIG. 56 |
| 7,600,552 B2 * | 10/2009 | Wu | B23Q 11/0825 | 160/222 |
| 7,784,379 B2 * | 8/2010 | Schirling | B23Q 11/0825 | 160/202 |
| 9,162,336 B2 * | 10/2015 | Sato | B23Q 11/0825 | |
| 9,481,065 B2 * | 11/2016 | Mang | B23Q 11/0816 | |
| 10,442,045 B2 * | 10/2019 | Ishikawa | B23Q 11/0825 | |
| 10,442,046 B2 * | 10/2019 | Ishikawa | B23Q 11/0825 | |
| 2002/0172570 A1 * | 11/2002 | Tsurumaki | B23Q 11/0825 | 409/134 |
| 2006/0225848 A1 | 10/2006 | O'Rourke et al. | | |
| 2011/0017410 A1 | 1/2011 | Yamishita et al. | | |
| 2012/0093601 A1 * | 4/2012 | Hirabayashi | B23Q 11/0891 | 409/134 |
| 2016/0333928 A1 | 11/2016 | Spinner | | |
| 2023/0182252 A1 * | 6/2023 | Nakanishi | B23Q 11/0891 | 409/134 |
| 2023/0271290 A1 * | 8/2023 | Yamazaki | B23Q 11/005 | 49/70 |

FOREIGN PATENT DOCUMENTS

| | | |
|---|---|---|
| DE | 2102951 | 8/1972 |
| DE | 8324107 | 2/1985 |
| DE | 8910253 | 11/1989 |
| DE | 3831477 | 3/1990 |
| DE | 4405247 | 8/1995 |
| DE | 19926882 | 12/2000 |
| DE | 102010006220 | 2/2011 |
| EP | 1782914 A1 | 5/2007 |
| EP | 2708318 | 3/2014 |
| JP | 4822884 | 3/1973 |
| JP | 606394 | 1/1985 |
| WO | 01/15852 | 3/2001 |
| WO | 2004/096490 | 11/2004 |

OTHER PUBLICATIONS

International Preliminary Report on Patentability from corresponding PCT Appln. No. PCT/EP2019/078037, dated Apr. 27, 2021.
English translation of Search Report from related Chinese Appln. No. 201980076976.8, dated Jul. 4, 2022. 2 pages.

* cited by examiner

TELESCOPIC COVER FOR A MACHINE TOOL

FIELD

The invention concerns a telescopic cover for a machine tool. The telescopic cover has a plurality of telescopic members which guided in a direction of travel are reciprocable relative to each other over a travel distance. The telescopic members are arranged in mutually overlapping relationship with respect to the direction of travel. In addition, they are respectively guided laterally in two guide rails which extend in the direction of travel and are spaced from each other in parallel relationship.

BACKGROUND

DE000008910253U1, DE000003831477A1 and DE00000202109A disclose box-like telescopic members with a cross-section which is U-shaped in its basic form. They are complicated and expensive, difficult to fit and require forceful effort to move them.

An object of the invention is to provide a telescopic cover of the general kind set forth, which is structurally less complicated and expensive, easier to manufacture and more easily displaceable.

SUMMARY

The specified object is already attained in that the telescopic members each have a portion with which they bridge over the spacing of the guide rails associated therewith forming a continuously arcuate cross-section in a first transverse direction perpendicularly to the direction of travel.

This therefore proposes a form for the portion of the telescopic members, that is structurally simple and nonetheless because of the arcuate shape mechanically stable, also providing actual cover for a machine opening to be covered. The term continuously arcuate shape is used to mean that the shape is steady in the mathematical sense and therefore does not have any edges, breaks, steps or the like. The curvature of the arcuate shape is advantageously steady, in particular remaining the same. The arcuate shape can be in the manner of a portion of a circular arc, elliptical or ellipsoidal, preferably identical to a portion involving the smaller diameter of an ellipsis. The arcuate shape can be provided with respect to a plane of mirror image symmetry perpendicularly to a second transverse direction perpendicular to the first transverse direction and in mirror-image symmetrical relationship with respect to the direction of travel.

The spacing is therefore bridged over transversely to the direction of travel, spacing here is equivalent to gapping, distance or the provision of an intermediate space. The portion can be the same or approximately the same as the gapping of the guide rails of a guide pair. That portion can be a central portion with respect to the first transverse direction.

Advantageously the overlap remains maintained over the entire travel distance so that at least a sealing effect as further described hereinafter in respect of the telescopic members is ensured.

In addition, the telescopic members can be arranged in mutually spaced parallel relationship transversely with respect to the direction of travel. The guidance of the telescopic members over the travel distance can be linear or arcuate, in particular in the form of a circular arc.

In an advantageous development of the telescopic cover the telescopic members, with respect to a second transverse direction, can be arranged perpendicularly or approximately perpendicularly to the direction of travel and the first transverse direction in mutually parallel relationship. In addition, the telescopic members, at least in the respective portion for bridging over the spacing between the guide rails, can be of a lamellar shape having two larger side surfaces which are mutually parallel with respect to the first transverse direction. The lamellar shape can be thin or leaf-like in particular in relation to the other dimensions of the portion. Advantageously of the two larger side surfaces, the one can be in the form of a concave side surface and the other in the form of a convex side surface. That lamellar shape is lighter in relation to the box shape according to the quoted state of the art and is thus of a low mass to be accelerated. It is mechanically stable, in particular stable in respect of shape, by virtue of the arcuate shape. In the context of the material properties and dimensions, by virtue of the measure according to the invention, like a leaf spring, a resilient movement in particular in the second transverse direction can be made possible to compensate for possible deformation for example due to acceleration. Both measures permit easier displaceability of the telescopic members.

Advantageously the concave side surface can be adapted to delimit an internal space in the machine tool and the convex side surface can be adapted to delimit a surrounding in relation to the internal space of the machine tool. When suitably installed in the machine tool the concave side surface delimits an internal space in the machine tool, from which the working head projects, and the convex side surface delimits a surroundings in relation to the machine tool, in which the working head projects through the machine cover.

It will be appreciated that a reversed association of the side surfaces relative to the internal space and to the surroundings respectively is also in accordance with the invention.

In a development of the telescopic cover the telescopic members can be arranged in structurally simple, mutually superposed step-like configuration, with respect to the first transverse direction. The sequence of the mutually superposed telescopic members can be continuous with respect to the first transverse direction. In the installation position the telescopic member which is the first in the continuous step-like sequence, together with the entire convex side surface of its portion, can thus define the internal space in the machine tool while the telescopic member which is last in the continuous step-like sequence together with the entire convex side surface of its portion delimits the surroundings in relation to the tool group.

As usual at least the telescopic member which is arranged centrally or approximately centrally with respect to the direction of travel can have a window opening for passing through a working head of the machine tool out of the internal space therein. The term window opening is used to mean a usual through opening for a telescopic cover. Preferably, in the case of an odd number of telescopic members, it is provided that at least the telescopic member which is the central one in relation to the sequence has the window opening.

In an advantageously simple fashion the guide rails can respectively be in the form of a groove or channel. In the installation position they can be designed to be open laterally towards the respectively associated telescopic member. The groove or the channel can be open laterally radially inwardly with respect to a central longitudinal axis of the telescopic cover, that extends in the direction of travel. To provide secure guidance they can be of a cross-sectional profile which is U-shaped with respect to the direction of travel.

The telescopic members can generally be arranged guided in the respectively associated guide grooves in rolling displaceable relationship, advantageously slidingly displaceable relationship. As usual however the telescopic member which is the front one in the direction of travel and the telescopic member which is the rear one in the direction of travel can be arranged invariably in respect of position in the associated guide rails.

The telescopic members can each have a further portion for engagement into the guide groove of the respectively associated guide rails in each case at both ends with respect to the first transverse direction. Thus the further portion can be in the form of a guide portion. The further portion can be arranged to extend in the first transverse direction away from the arcuate portion. Desirably the further portion of the telescopic members can be adapted to the cross-section of the guide rail associated therewith.

In a simple embodiment of the telescopic cover the further portion of the telescopic members can be of a cross-section which is right-angled with respect to the direction of travel. It can be in the form of a rib-like projection extending in the direction of travel. That is structurally simple. In addition the torsional stiffness of the telescopic members is enhanced thereby.

In a structurally advantageously simple and mechanical stable fashion the guide rails can be combined together block-wise. All guide rails arranged at one side of the telescopic members can be disposed in one block and all others of the guide rails arranged at the other side of the telescopic members can be arranged in another block. The guide rails can be provided in the form of mutually parallel grooves in the respective block.

In another particular embodiment of the telescopic cover the further portion of the telescopic members can be in the form of a laterally open channel of a cross-section like a ring portion with respect to the direction of travel. In addition the channel can be arranged to extend in the first transverse direction away from the arcuate portion. In particular the two channels of a telescopic member can be associated with the telescopic member which is radially inwardly adjacent with respect to the direction of travel of the telescopic cover, as guide rails. The two channels of a telescopic member can thus be associated with the telescopic member adjacent thereto, whose convex side surface is towards it or which curves towards it with its convex side surface.

In the installation position the two channels of a telescopic member can at the same time for their guidance engage into the two channels of the telescopic member which is adjacent radially outwardly with respect to the direction of travel of the telescopic cover. The two channels can thus be associated with the telescopic member which is adjacent thereto and whose concave side surface is towards it or which curves with its convex side surface away from it.

In an alternative configuration of the telescopic cover the telescopic members can preferably be combined together in paired relationship to provide a respective enlarged telescopic member. The telescopic members which are combined together in a pair can be arranged in mutually spaced relationship with respect to the direction of travel. It is possible to provide over the travel distance a neutral position in which the telescopic members are arranged symmetrically relative to each other with respect to a central plane of symmetry perpendicularly to the direction of travel. In a structurally advantageous fashion the two outer telescopic members with respect to the plane of symmetry can be arranged to be fixedly connected together by way of their further portions, thereby providing the enlarged telescopic member. Adjoining same the telescopic members adjacent to the outer telescopic members can also be combined together to provide an enlarged telescopic member. Adjoining same the telescopic members adjacent in the direction towards the plane of symmetry can be combined together to provide an enlarged telescopic member and so forth. As here two respective telescopic members are combined together to form an enlarged telescopic member an optimum number of telescopic members of the telescopic cover should involve an even numerical value. In that way the inner enlarged telescopic member which is combined together from the two inner telescopic members can have the window opening for the machine head. In the other telescopic members which are arranged radially further outwardly with respect to the travel direction the associated two telescopic members are desirably spaced from each other at a spacing larger than the extent of the window opening, axially with respect to the travel direction.

To bridge over the spacing the mutually associated two further portions can be connected together. For that purpose those further portions can be virtually prolonged to extend in the direction of travel relative to each other and can be integrally connected to each other. In that way the two further portions can be combined together to constitute a unit. That can be of an identical cross-section over its entire axial extent with respect to the direction of travel. The cross-section can be unchanged over the entire axial extent. The axial spacing can be equal to the spacing of the unconnected telescopic members, which are equivalent to the telescopic members together in pairs, in the neutral position. In that way all enlarged telescopic members each have a through opening which however is larger with respect to the direction of travel than the window opening of the inner enlarged telescopic member.

Usually the telescopic members can respectively be arranged sealingly in relation to the adjacent telescopic members in the second transverse direction and/or sealingly in relation to the respectively associated guide rails. A sealing lip can respectively be provided at least at one of two adjacent telescopic members, preferably at both ends, with respect to the direction of travel. In the installation position in the telescopic cover the lip can bear sealingly against the other telescopic member and/or sealingly against the respectively associated guide rail. In addition the sealing lip can bear at the foot sealingly against the guide rail. The sealing lip of each telescopic member can extend in a direction parallel or approximately parallel to the second transverse direction from its concave side surface towards the convex side surface of the adjacent telescopic member.

In addition the telescopic members can be arranged spaced by way of a gap with respect to the second transverse direction, in relation to the respectively adjacent telescopic members. The sealing lip which acts sealingly between the adjacent telescopic members can sealingly bridge over the gap. In the installation position it can bear sealingly against the other telescopic member and/or sealingly against the respectively associated guide rails. The gap width can be less than the width, preferably less than half the width, of the telescopic members in each case in the second transverse direction.

The telescopic members can be connected together for example by way of entrainment means. In that case the telescopic members can be successively entrained by the respectively adjacent leading telescopic member when it is properly extended. In that respect abutment pulses can occur, which is disadvantageous. Preferably the telescopic members are arranged coupled for movement with each other with respect to the direction of travel. The telescopic members can be arranged to be coupled for movement with each other by way of a scissor mechanism with at least one link chain. All members can be moved at the same time by means of the scissor mechanism, whereby no abutment pulses occur. As is known the movement of the individual telescopic members can be synchronized by the motional coupling by way of the scissor mechanism.

The telescopic cover can have a frame to which the guide rails and the outer telescopic members are arranged held immovably in the proper operative position.

To save weight the telescopic members can each have at least one rib-like reinforcing structure at their concave side surface. That measure provides for a reduction in the weight to be accelerated and also an increase in a torsional stiffness of the reinforcing ribs.

Advantageously in terms of manufacture and assembly the telescopic members can each be made in one piece from plastic. In addition they can be produced by means of additive production. In principle the telescopic members can be produced by means of all known additive production processes, in particular for plastics. These include stereolithography, poly-jetting, fused depositing modeling (FDM) and laser sintering.

Preferably selective laser sintering (SLS) can be used for producing the telescopic members. For that purpose material in powder form can be drawn or applied stepwise or layerwise on to a building platform. The layer contour of the telescopic member to be created is sintered or fused into each powder layer by a laser. Advantages of selective laser sintering over other additive processes that may be mentioned are for example that undercut configurations (undercut contours) can be produced without complication and in addition no further support contours for production of the component contour are necessary. The use of selective laser sintering therefore allows uncomplicated and straightforward implementation even of complicated shapes.

BRIEF DESCRIPTION OF THE DRAWINGS

Further details and advantages of the invention are described more fully hereinafter without restriction on the scope of protection by the description of a preferred embodiment with reference to the accompanying drawings. In the description all terminology relating to the description of a location like up, down, front, rear, right and left are intended as they are shown in the respective Figure itself, unless otherwise defined. In the drawings.

DETAILED DESCRIPTION

FIGS. 1 through 7 show different side views, partial views, sectional views and individual views of different embodiments of a telescopic cover 1 or components thereof for a machine tool (not shown here). The telescopic cover 1 has a plurality of telescopic members 2 which are arranged reciprocably guided here linearly in a direction of travel v relative to each other over a travel distance w. They are arranged in mutually overlapping relationship with respect to the direction of travel v. The overlap is maintained over the entire travel distance w. The telescopic members 2 are respectively guided laterally in two guide rails 3 extending in the direction of travel v. The guide rails 3 are arranged in mutually parallel spaced relationship at a spacing a transversely to the direction of travel v.

The telescopic members 2 respectively bridge over the spacing a transversely to the direction of travel v. As can be seen for example from FIGS. 1A, 1C, 2A, 2B and 3A the telescopic members 2 each have a portion 21 with which they bridge over the spacing a between the two guide rails associated with them. The bridging configuration is transverse relative to the direction of travel v. It is effected with the implementation of a cross-section which is continuously arcuate with respect to a first transverse direction q1, perpendicularly to the direction of travel v. The arcuate shape is here shallow and also steady, that is to say without the involvement of interruptions, edges, breaks or sudden changes. The arcuate shape is elliptical, more specifically equal to a region of an ellipse, in which it is of the smaller diameter. It is of a height h shown in FIG. 2B, which is a multiple of its extent in the second transverse direction q2. By way of example, as shown in FIG. 2B, the extent e in the second transverse q2 is approximately ten times as great as the height h. The arcuate shape is of a mirror-image symmetrical configuration with respect to a central plane of mirror-image symmetry S1 perpendicularly to the first transverse direction q1. That portion 21 is a central portion with respect to the first transverse direction q1. The telescopic members 2 are arranged parallel from each other with respect to the second transverse direction q2. The telescopic members 2 remain arranged in mutually overlapping relationship over the entire travel distance v with respect to the direction of travel. The telescopic members 2 are each of a rectangular base shape with respect to the second transverse direction q2.

In the portion A the telescopic members 2 for bridging over the spacing a between the guide rails 3 are of a flat lamellar form with two larger side surfaces 22 which are parallel to each other with respect to the first transverse direction q1. As a result of the elliptical curvature the one side surface 22 is in the form of a concave side surface 221 and the other side surface 22 is in the form of a convex side surface 222. The concave side surface 221 is designed to delimit an internal space in the machine tool (not shown here) and the convex side surface 222 is intended to delimit a surrounding in relation to the internal space in the machine tool. In the embodiments illustrated here of the machine cover 1 shown in FIGS. 1 through 5 the telescopic member 2 which is central with respect to the direction of travel v has a window opening 23 for engagement therethrough of a working head provided on the machine tool, through the cover 1.

The telescopic members 2 are arranged in mutually superposed stepped relationship with respect to the first transverse direction q1 in a continuous sequence. The telescopic member 2 which is the lower one in FIGS. 1A and 6A is designed to delimit the internal space in the machine tool in the installation position with its entire concave side surface 221 of its portion 21, which surface is at the underside.

Figure 1A:
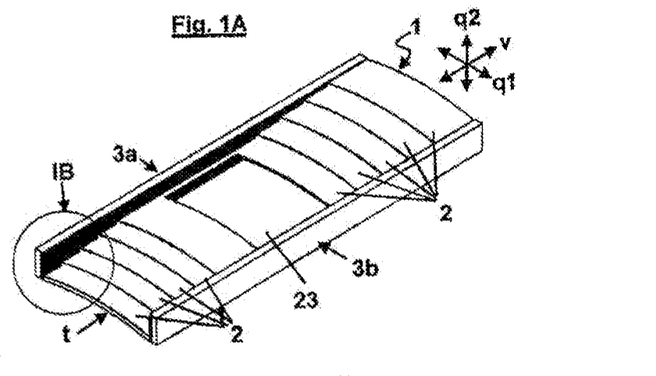
FIGS. 1A-1G show different views and partial views respectively illustrating an embodiment of a telescopic cover with a plurality of telescopic members and associated guide rails.
Figure 1B:
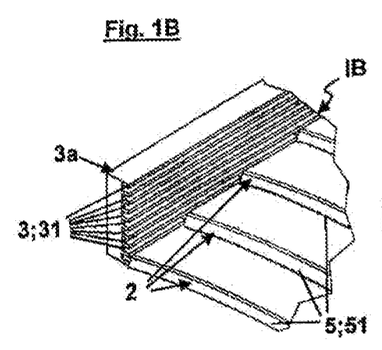
Figure 2A:
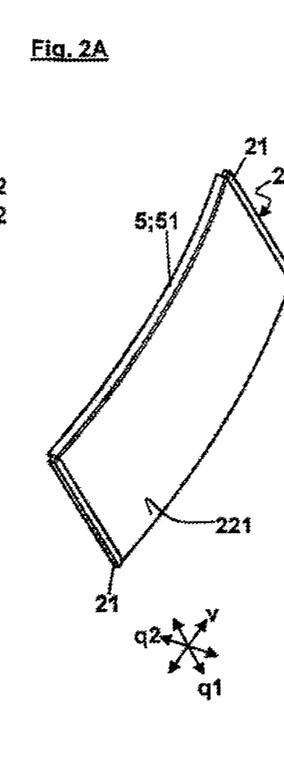
FIGS. 2A-2D show different views and partial views respectively illustrating a telescopic member of the telescopic cover of FIGS. 1A-1G.
Figure 2B:
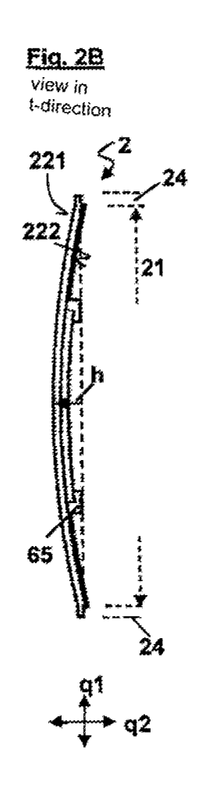
Figure 2C:
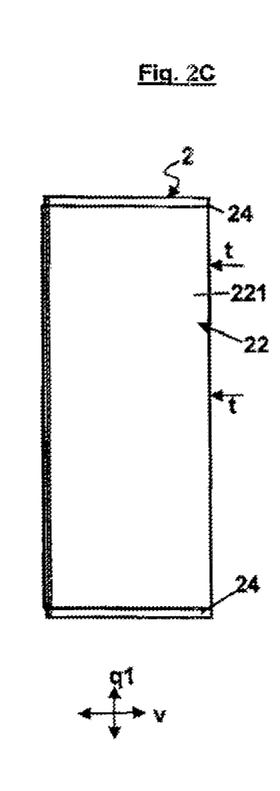
Figure 6A:
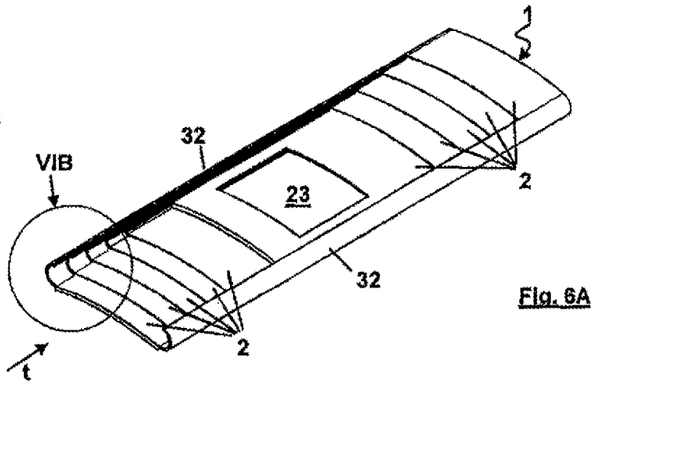
FIGS. 6A-6G show different views and partial views respectively illustrating a further embodiment of the telescopic cover with a plurality of telescopic members.
Figure 6B:
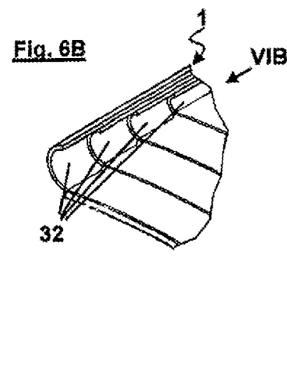
Figure 6C:
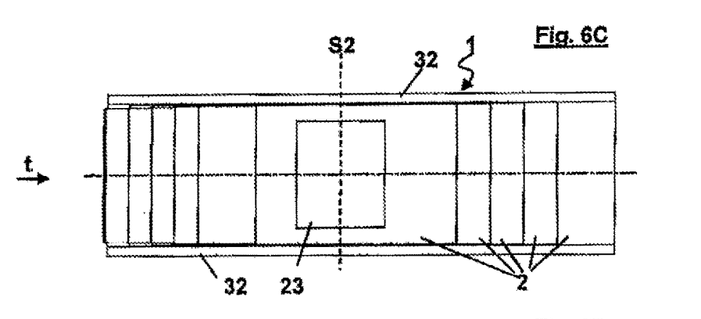
Figures 6D, 6E:
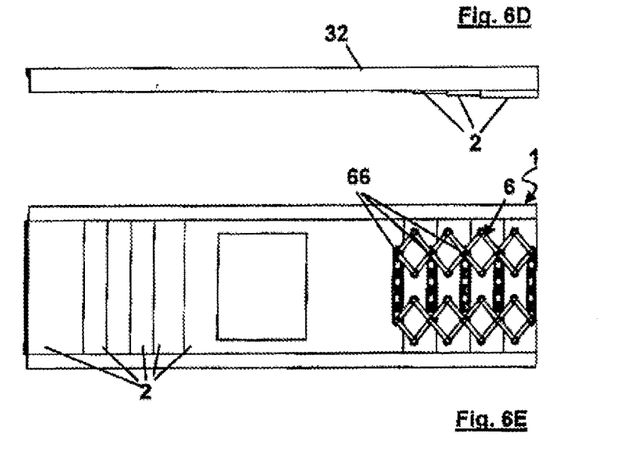
Figure 6F:
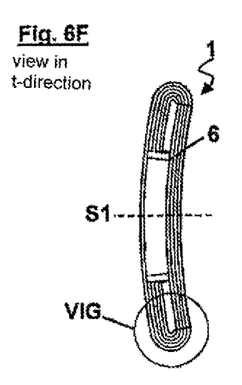
Figure 6G:
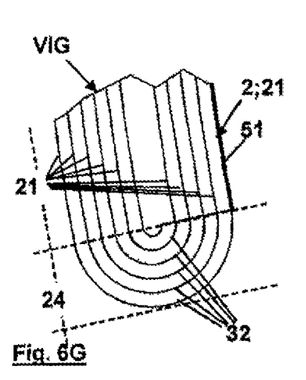
Figure 7A:
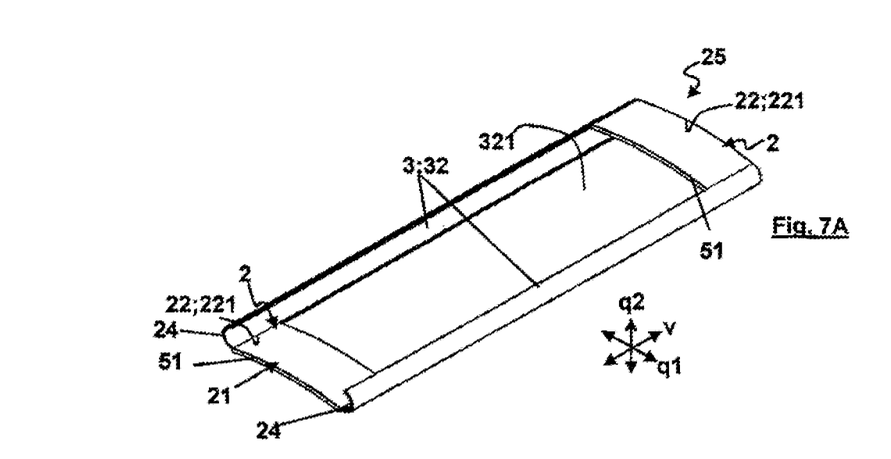
FIGS. 7A-7E show different views and partial views each illustrating a telescopic member of the telescopic cover of FIGS. 6A-6G.
Figure 7B:
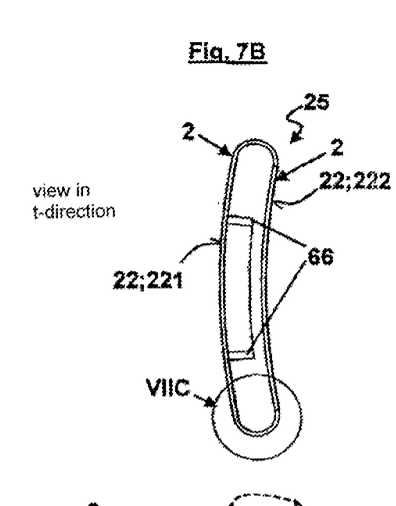
Figure 7C:
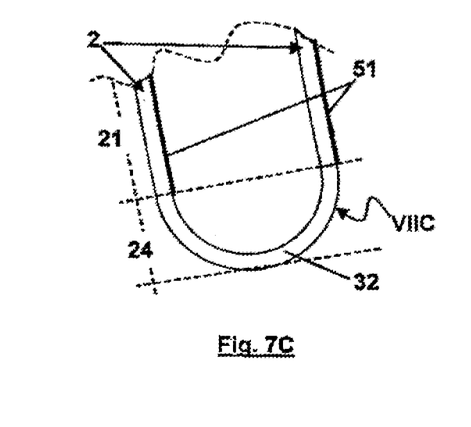
Figure 7D:
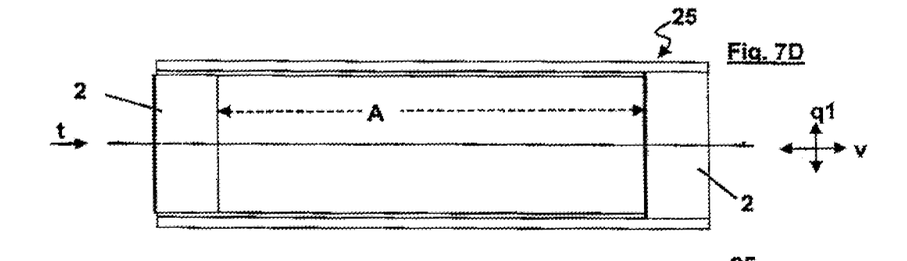
Figure 7E:
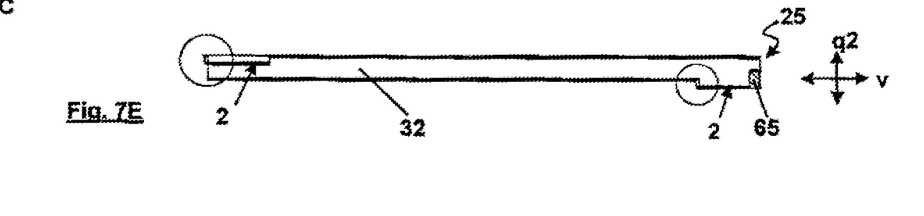

Correspondingly the upper telescopic member 2 in FIGS. 1A and 6A is designed to delimit the surroundings in relation to the machine tool in the installation position with its entire upwardly facing convex side surface 222 of its portion 21.

In the embodiments of the telescopic cover 1 shown here the telescopic members 2 are coupled together for movement with each other with respect to the direction of travel v. In that way the movement of the telescopic members 2 in the direction of travel v is synchronized. They are motionally coupled together by way of a conventional scissor mechanism 6. All telescopic members 2 can be moved together at the same time by virtue of the scissor mechanism 6. Here the scissor mechanism 6 has two parallel link chains 61 working in the same way, comprising scissor lever elements 62 which are arranged in a row with each other in the direction of travel v. They are respectively formed from two bars 64 held pivotably at an intersection point 63, as the levers. The scissor lever elements are rotatably connected together at the respective ends of the bars 64. Each individual one of the telescopic members 2 connected to the scissor mechanism 6 is connected to the intersection point 63 of the scissor lever element 62 associated therewith. For that purpose the telescopic members 2, for each intersection point 63 of the link chains 61, have a point of rotation 66 at which the associated intersection point is rotatably mounted. The intersection points 63 are clipped on at the points of rotation 66 in an assembly-friendly fashion. As there are two parallel link chains 61 the telescopic members 2 respectively have two points of rotation 66 for a respective scissor element 62 of the link chains 61. Provided at each telescopic member 2 is a longitudinal projection 65 extending in the first transverse direction q1. A respective point of rotation 66 is arranged at same at both ends thereof, wherein the points 66 are spaced from each other in the first transverse direction q1 and more specifically are arranged in mirror-image symmetrical relationship with respect to a central longitudinal axis parallel to the direction of travel v. Here the scissor mechanism 6 is arranged at the concave side surfaces 221 of the telescopic members 2. In that way in the installation position they are disposed protected in the interior of the machine tool (not shown here).

In the embodiments of the machine cover 1 shown in FIGS. 1 through 5 the guide rails 3 are respectively in the form of a groove 31 and as shown in FIGS. 6 and 7 they are in the form of a channel 32. In the installation position in the machine cover 1 they are of a laterally open configuration facing towards each other and towards the telescopic members 2. They are of a U-shaped cross-sectional profile with respect to the direction of travel. The telescopic members 2 are here guided slidingly displaceably linearly in the guide rails 3. As usual the two outer telescopic members 2 in the direction of travel v are arranged held invariably in position in relation to the guide rails 3.

For engagement into the respective guide rail 3 the telescopic members 2 each have a further portion 24 at both ends with respect to the first transverse direction q1. The portion 24 extends in the first transverse direction q1 away from the arcuate central portion 21. The further portion 24 of the telescopic members 2 is of a configuration adapted to the cross-section of the guide rail 3 associated therewith.

Figure 4A:
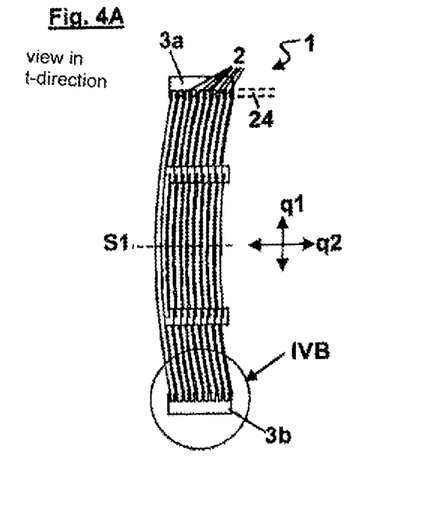
Figure 4B:
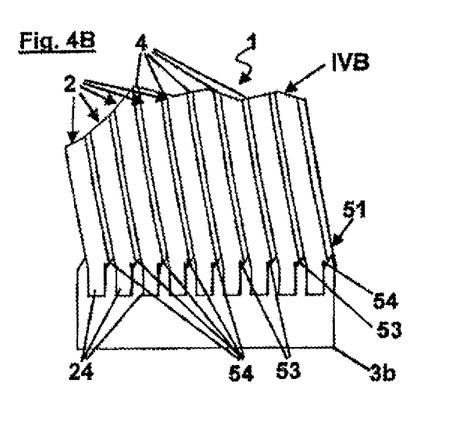

Turning to the embodiments of the telescopic cover 1 in FIGS. 2 through 4 the further portion 24 of the telescopic members 2 is of a rib-like configuration. They are shown in the partial enlarged views ID, IVB and VB in FIGS. 1D, 4B and 5B taken from FIGS. 1C, 4A and 5A respectively. In accordance therewith the further portion 24 is of a right-angled cross-section with respect to the first transverse direction q1. In addition the guide rails 3 which are here in the form of mutually parallel grooves 31 are combined together block-wise in an uncomplicated fashion. The ones of the two guide rails 3 provided for each telescopic member 2 are arranged in a block 3a and the others of the two guide rails 3 provided for each telescopic member 2 are arranged in another block 3b. The blocks 3a and 3b are of the same structure. In addition the telescopic cover 1 has an odd number of telescopic members 2, here seven telescopic members 2, in which case the telescopic member 2 which is the central one in the sequence, here being the third one, has the window 23. The window 23 is arranged centrally with respect to the first transverse direction q1 and the direction of travel v.

In a further simplification of the telescopic cover 1 the telescopic members 2 are assembled as shown in FIGS. 5 and 6 in paired relationship to constitute an enlarged telescopic member 25. The two telescopic members 2 which in a neutral position are arranged symmetrically relative to each other with respect to a central plane of symmetry S2 perpendicularly to the direction of travel v are assembled in paired relationship. As can be seen from FIG. 7 the two telescopic members which are the outer ones with respect to the plane of symmetry S2 are combined to form an enlarged telescopic member 25. That enlarged telescopic member 25 is stationary. In addition the two telescopic members 2 which are respectively adjacent thereto are fixedly connected together stepwise by way of the further portions 24 thereof. In all cases the further portions 24 in the enlarged telescopic member 25 are effectively prolonged in extending relationship with each other in the direction of travel v and are integrally connected together. The spacing A which is axial with respect to the direction of travel v and by way of which the two telescopic members 2 are arranged spaced from each other in the neutral position is maintained unchanged in the enlarged telescopic member 25.

In addition the further portion 24 of the telescopic members 2 as shown in FIGS. 6 and 7 is in the form of a laterally open channel 32 of a cross-section which is like a portion of a ring transversely relative to the direction of travel v. The two channels 32 of a telescopic member 2 serve as guide rails 3 for the telescopic member 2 which is adjacent radially inwardly with respect to the direction of travel v of the telescopic cover 1. This means that the inwardly adjacent telescopic member 2 is guided slidingly displaceably and linearly in the further portions 24, in the form of channels 32, of the telescopic member 2 which is outwardly adjacent thereto. Accordingly the further portions 24 of a radially outward telescopic member 2 form the guide rails 3 or the channels 32 for the telescopic member 2 which is radially inwardly adjacent thereto. The telescopic member 2 which is radially outward with respect to the direction of travel v or which is rearward with respect to the second transverse direction q2 is arranged statically in the telescopic cover 1 while the other telescopic members 2 are arranged moveably relative to each other in the direction of travel v in the telescopic cover 1. The two channels 32 of a telescopic member 2 are thus associated with the telescopic member which is adjacent thereto and whose convex side surface 222 is towards same. The two channels 32 of a telescopic member 2 are associated with the telescopic member 2 which is adjacent thereto and whose convex side surface 222 curves outwardly towards it. Accordingly the channels 32 are nested within each other, wherein in the installation position an inner channel 32 fits snugly into the outer channel 32 associated therewith.

The enlarged telescopic member 25 which is central with respect to the direction of travel v has the window opening 23. Likewise the other enlarged telescopic members 25 each have a through opening 231, as a result of the spacing of the paired telescopic members 2 forming them. Their respective axial extent with respect to the direction of travel v however is greater than the axial extent of the window 23 of the inner enlarged telescopic member 25. That is of such a dimension that the window opening 23 of the central enlarged telescopic member 25 is not covered in any position over the travel distance w, even partially, by one of the other enlarged telescopic members 25.

Mutually adjacent telescopic members 2 are spaced from each other by a gap 4. The gap 4 is sealingly bridged over by means of a seal 5. A respective sealing lip 51 is provided at both ends at one of two sealingly mutually arranged telescopic members 2, with respect to the direction of travel v. The lip bears in the installation position sealingly against the other telescopic member 2 and in addition sealingly against the respective two associated guide rails 3. The sealing lip 51 of each telescopic member 2 extends in a direction parallel or approximately parallel to the second transverse direction q2 from the concave side surface 221 thereof towards the convex side surface 222 of the adjacent telescopic member 2 in the second transverse direction q2.

In addition the sealing lip 51 bears at its foot in sealing relationship against the guide rail 3, from which it extends. In the embodiment shown in FIGS. 1 and 2 or FIGS. 5 and 6 a sealing action is achieved in that the cross-section of the further portion 24 is adapted to that of the groove 31 or that of the channel 32. As can be seen from FIGS. 1C and 1D the sealing lip 51, with respect to the first transverse direction q1, has at both ends a respective step 52 with an edge 54 extending in the direction of travel v.

Figures 1C, 1D, 1E, 1F, 1G:
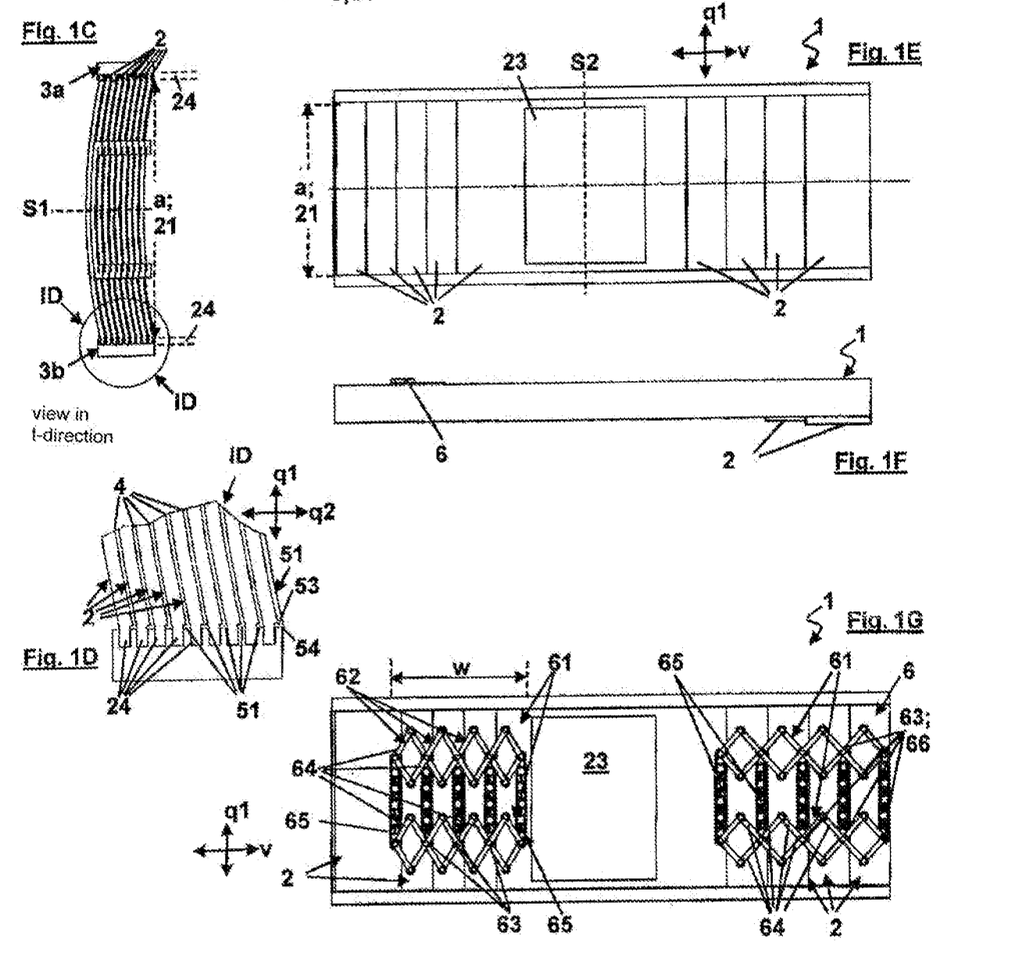
Figure 4C:
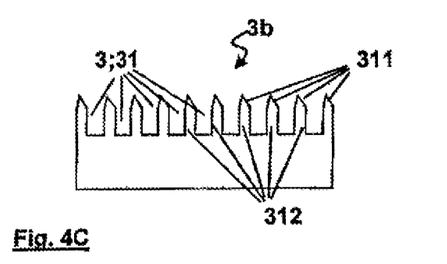
FIG. 4C shows an end view of guide rails assembled to form a block.
Figure 5A:
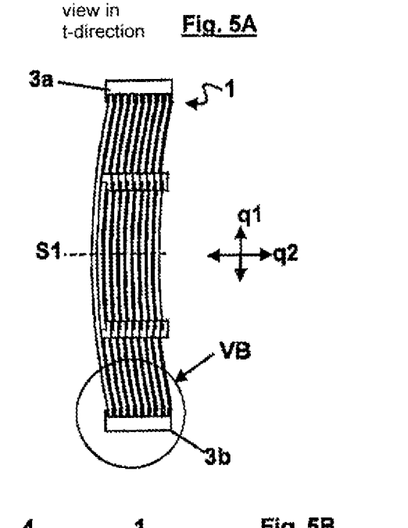
FIGS. 5A-5B show a side view and a partial view of a further embodiment of the telescopic cover.
Figure 5B:
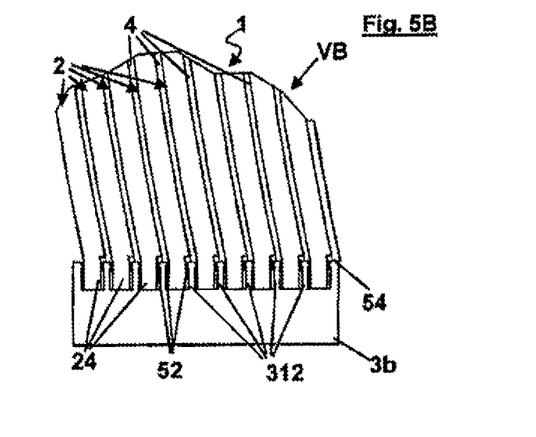
Figure 5C:
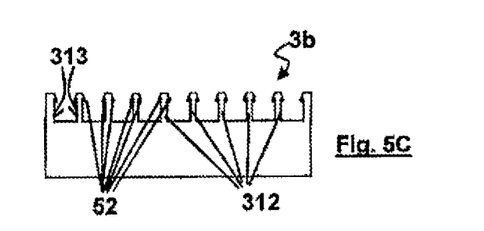
FIG. 5C shows an end view of guide rails assembled to form a block.

Referring to FIGS. 1C and 1D the top side 311 of a wall 312 delimiting the associated groove 31 is in the form of a sealing surface, against which the sealing lip 51 bears sealingly with its step 52. As shown in FIGS. 4A through 4C that top side 331 is chamfered towards the plane of mirror-image symmetry E1, wherein the sealing lip 51 engages with its edge 54 sealingly against the chamfered top side 311. Referring to FIGS. 5A through 5C additional sealing lips 51 are provided at both inside surfaces 313 of the grooves 31, which lips sealingly engage the further portion 24 of the associated telescopic member 2. In order to indicate possible combinations of those three sealing measures in FIGS. 5A through 5C the sealing lip 51 also bears sealingly with its step 52 against the top side 311, as in FIGS. 1C-1D.

All telescopic members 2; 25 are provided in one piece. They are respectively produced in one piece from plastic by means of additive production.

Figure 2D:
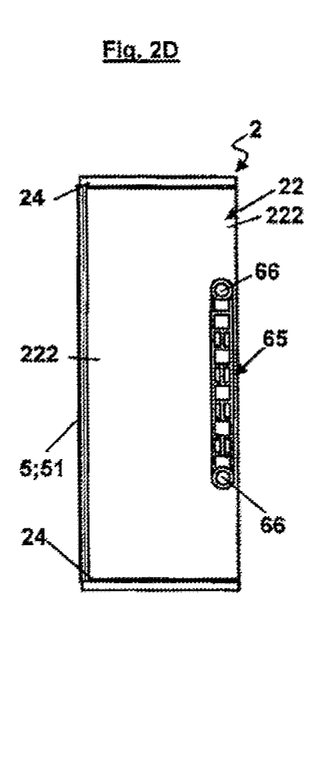
Figure 2E:
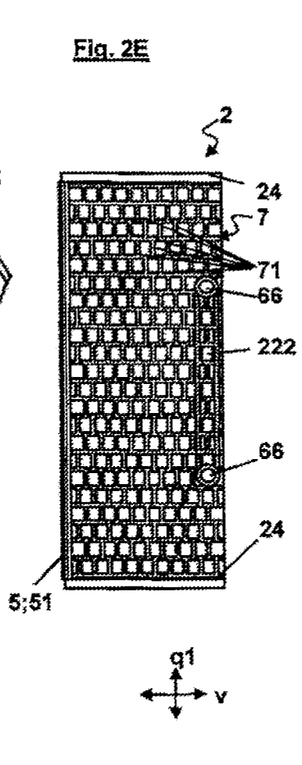
FIG. 2E shows a side view of a telescopic member similar to that shown in FIGS. 2A-2D but with a structured surface.
Figures 3A, 3B, 3C, 3D:
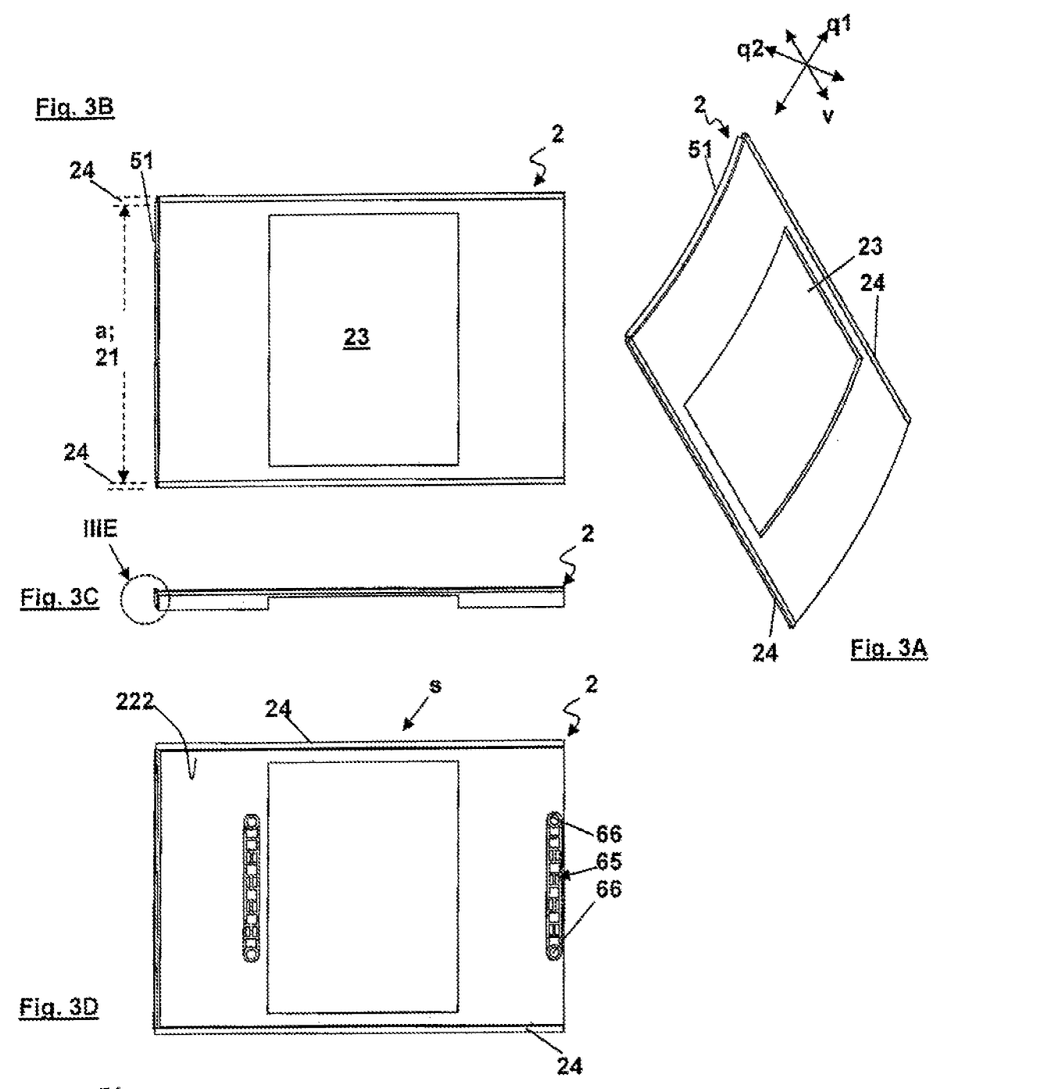
FIGS. 3A-3E show different views and partial views respectively illustrating a central telescopic member of the telescopic cover of FIGS. 1A-1G, FIGS. 4A-4B show a side view and a partial view respectively of a further embodiment of the telescopic cover.
Figure 3E:
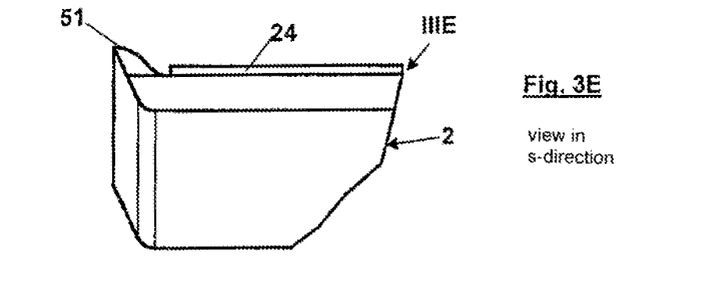

FIGS. 2D and 2E respectively show a side view of an embodiment of a telescopic member 2. In accordance therewith the concave side surface 221 thereof can be smooth as shown in FIG. 2D or, as shown in FIG. 2E, can be provided covered with a reinforcing structure 7, here comprising a grid of parallel ribs 71. In both cases the projection 65 projects in the second transverse direction q2. That is also provided with a reinforcing structure 7 to save on material.

LIST OF REFERENCES 1 telescopic cover
2 telescopic member
21 portion
22 side surface
221 convex side surface
222 concave side surface
23 window opening
231 through opening
24 further portion
25 enlarged telescopic member
3 guide rail
3a block
3b block
31 groove
311 top side
312 wall
313 inside surface
32 channel
4 gap
5 seal
51 sealing lip
52 further sealing lip
53 step
54 edge
6 scissor mechanism
61 link chain
62 scissor lever element
63 intersection point
64 bar
65 projection
66 point of rotation
7 reinforcing structure
71 rib
A spacing
a spacing
S1 plane of mirror-image symmetry
S2 plane of symmetry
q1 first transverse direction
q2 second transverse direction
v direction of travel

What is claimed is:

1. A telescopic cover for a machine tool, comprising:
wherein the telescopic cover has a plurality of telescopic members which guided in a direction of travel are reciprocable relative to each other over a travel distance,
wherein the telescopic members are arranged in mutually overlapping relationship with respect to the direction of travel and are arranged disposed in an arising step-like way one above another with respect to a first transverse direction perpendicular to the direction of travel from a first telescopic member which is first in a continuous step-like sequence to a last telescopic member which is last in the continuous step-like sequence,
wherein the telescopic members are respectively guided laterally in two guide rails which extend in the direction of travel and are spaced from each other in parallel relationship at a spacing and wherein the telescopic members each have a portion with which they bridge over the spacing of the guide rails associated therewith forming a continuous arcuate cross-section in the first transverse direction and wherein the telescopic members have a further portion for engagement into a guide groove of the respectively associated guide rails in each case at both ends of the telescopic members with respect to the first transverse direction wherein each of the two further portions is arranged to extend in the first transverse direction away from the arcuate portion and is in a form of a laterally open channel, wherein openings of the two laterally open channels are directed towards each other, respectively, wherein the two laterally open channels are associated with one of the telescopic members which is adjacent radially inwardly with respect to the direction of travel of the telescopic cover and for their guidance engage into the two laterally open channels of another one of the telescopic members which is adjacent radially outwardly with respect to the direction of travel of the telescopic cover, wherein the telescopic members are combined together in paired relationship respectively to provide a one piece enlarged telescopic member, wherein, with respect to a plane perpendicular to the direction of travel from which the two telescopic members forming the one piece enlarged telescopic member have an equal distance, the two telescopic members forming the one piece enlarged telescopic member which are outward relative to the plane and, further stepwise towards the plane, the two telescopic members forming the one piece enlarged telescopic member are arranged connected together by way of their channels in prolonged fashion towards each other and combined together to constitute a unit which has an identical cross-section over its entirely axial extent with respect to the direction of travel.

2. The telescopic cover as set forth in claim 1, wherein at least the telescopic member which is arranged centrally or approximately centrally with respect to the direction of travel has a window opening for passing therethrough a working head of the machine tool out of the internal space thereof.

3. The telescopic cover as set forth in claim 1, wherein the telescopic members are sealingly coupled together.

4. The telescopic cover as set forth in claim 1, wherein the telescopic members are motionally coupled together by way of a scissor mechanism.

5. The telescopic cover as set forth in claim 1, wherein the telescopic members are respectively made in one piece from plastic.

6. The telescopic cover as set forth in claim 1, wherein the telescopic members are produced by means of additive manufacture.

7. The telescopic cover as set forth in claim 1, wherein the telescopic members are arranged with respect to a second transverse direction perpendicularly or approximately perpendicularly to the direction of travel and relative to the first transverse direction parallel to each other and at least in the portion for bridging the spacing between the guide rails are of a lamellar form with two larger side surfaces which are parallel to each other with respect to the first transverse direction and of which one is in the form of a concave side surface and the other is in the form of a convex side surface.

8. The telescopic cover as set forth in claim 7, wherein the concave side surface is adapted to delimit an internal space in the machine tool and the convex side surface is adapted to delimit a surrounding relative to the internal space in the machine tool.

9. The telescopic cover as set forth in claim 7, wherein the telescopic members respectively have a rib-like reinforcing structure at least at their concave side surface.

10. The telescopic cover as set forth in claim 1, wherein the telescopic members are respectively arranged in sealing relationship with the telescopic members which are adjacent in the second transverse direction and/or are arranged sealingly in relation to the respectively associated guide rails.

11. The telescopic cover as set forth in claim 10, wherein the telescopic members are arranged spaced by way of a gap relative to the respectively adjacent telescopic members with respect to the second transverse direction, wherein the sealing lip sealingly bridges over the gap.

12. The telescopic cover as set forth in claim 1, wherein there are provided at least on one of two telescopic members which are arranged in sealing relationship with each other at both ends with respect to the direction of travel a respective sealing lip which in the installation position respectively bears sealingly against the other telescopic member and/or sealingly against the respectively associated guide rail.

13. The telescopic cover as set forth in claim 12, wherein the telescopic members are arranged with respect to a second transverse direction perpendicularly or approximately perpendicularly to the direction of travel and relative to the first transverse direction parallel to each other and at least in the portion for bridging the spacing between the guide rails are of a lamellar form with two larger side surfaces which are parallel to each other with respect to the first transverse direction and of which one is in form of a concave side surface and the other is in the form of a convex side surface, wherein the sealing lip of each telescopic member extends in a direction parallel or approximately parallel to the second transverse direction from its concave side surface towards the convex side surface of the adjacent telescopic member.

* * * * *